United States Patent [19]
Tamagaki

[11] Patent Number: 5,910,849
[45] Date of Patent: Jun. 8, 1999

[54] MAINTENANCE SYSTEM FOR IMAGE-FORMING APPARATUSES

[75] Inventor: Akira Tamagaki, Soraku-gun, Japan

[73] Assignee: Sharp Kabushiki Kaisha, Osaka, Japan

[21] Appl. No.: 08/740,785

[22] Filed: Nov. 1, 1996

[30] Foreign Application Priority Data

Nov. 1, 1995 [JP] Japan ................................ 7-284967

[51] Int. Cl.⁶ .............................. H04N 1/32; H04N 1/40; H04N 1/00
[52] U.S. Cl. ......................... 358/442; 358/443; 358/401
[58] Field of Search .................................. 358/442, 400, 358/401, 403, 404, 406, 434, 435, 436, 438, 439, 468, 474, 443; 379/100.01

[56] References Cited

U.S. PATENT DOCUMENTS 5,477,338 12/1995 Fujii et al. ............................... 358/400

FOREIGN PATENT DOCUMENTS

| 4102868 | 4/1993 | Japan | H04N 1/00 |
| 6044791 | 6/1994 | Japan | H04N 1/32 |
| 6095240 | 11/1994 | Japan | H04N 1/46 |

Primary Examiner—Thomas D. Lee
Assistant Examiner—Jerome Grant, II

[57] ABSTRACT

A maintenance system for image-forming apparatuses equipped with image-scanning means for reading images of documents, and image-forming means for forming the images based on the image data and preset state data, including an external maintenance apparatus which is connected to an image-forming apparatus, adjusts the state data on the basis of the image data and the state data read from the image-forming apparatus, and sets the adjusted state data to the image-forming apparatus, and if necessary, further including a host apparatus which is connected to the external maintenance apparatus, adjusts the state data on the basis of the image data and the state data which are transmitted from the external maintenance apparatus, and sets the adjusted state data for the image-forming apparatus via the external maintenance apparatus.

19 Claims, 11 Drawing Sheets

MAINTENANCE SYSTEM FOR IMAGE-FORMING APPARATUSES

BACKGROUND OF THE INVENTION

1. Field of the Invention

The present invention relates to an image-forming apparatus, such as a digital copier, for forming images of documents on sheets of paper, and more particularly to a maintenance system for adjusting the operation state of an image-forming apparatus with the aid of an external apparatus.

2. Description of the Related Art

There are a plurality of variables to be set for image-forming apparatuses such as digital copiers which affect the state of the images formed, such as drive voltages of light sources and I/O conversion curves when the images are processed. In addition, the optimum values of such variables to be set vary depending on the progress of fatigue of the apparatuses and the types of documents. Accordingly, in order to maintain the proper state of the images formed by image-forming apparatuses at all times, the values of the plurality of variables must be adjusted for optimization at relatively short intervals.

It is difficult and complicated, however, for the user to properly adjust the plurality of variables, and therefore a maintenance system has been eagerly sought which facilitates the adjustment of the values of the respective settings.

A solution is presented in Japanese Examined Patent Application HEI 6-44791 which discloses a remote troubleshooting method for communication terminals, wherein the center requests the communication terminal to send the set operational parameters to verify and modify the settings of the operational parameters, and instructs the communication terminal to reset the operational parameters based on the modified settings.

In addition, Japanese Examined Patent Application HEI 6-95240 discloses an image-forming apparatus by which a given test chart is output as an image which is in turn read as a document, and the features are precisely adjusted on the basis of the image data of the read test chart while preventing interference between the spatial frequencies of the image-reading device and the spatial frequencies of the image-output device.

Being designed to modify the settings for the operation state according to preset operational parameters or on the basis of the results of reading of a predetermined test chart, however, the image-forming apparatuses of the prior art have the problem of being incapable of accomplishing high-precision adjustment when the document is not of an expected type, for example. An additional problem is that since the image-forming operation must be suspended until the adjusting operation is completed, and thus the image-forming operation cannot be completed rapidly.

SUMMARY OF THE INVENTION

It is an object of the present invention to provide a maintenance system for image-forming apparatuses which allows fine adjustment even when the document is not of an expected type, and speeds up the image-forming operation by shortening downtime during the image-forming operation.

In a first aspect of the invention, an external maintenance apparatus connected to an image-forming apparatus is used, image data and state data are read from the image-forming apparatus to adjust the state data on the basis of the image data and the state data, and the adjusted state data is set for the image-forming apparatus. Accordingly, a fine adjusting operation is accomplished depending on the image data and the state data. Furthermore, since the adjusting operation is performed with the external maintenance apparatus, processing for image formation may be carried out even during the process of adjustment, with being able to cope with speedy processing as required.

Further, in the invention, the history of the adjusted state data set for the image-forming apparatus via the external maintenance apparatus is stored. This allows rapid adjustment of the present state data on the basis of the history of the adjusted state data.

In addition, the invention allows temporary adjustment of the state data so as to match a document of a specific type depending on the usage of the image-forming apparatus. In other words, when a specific mode is set for the image-forming apparatus, the state data is adjusted according to the mode.

In another aspect of the invention, a host apparatus, which is connected to the external maintenance apparatus, adjusts the state data on the basis of the image data and the state data, and sets the adjusted state data for the image-forming apparatus via the external maintenance apparatus. This means that adjusting operation by using adjusting performance beyond the adjusting capability of the external maintenance apparatus may be accomplished with the host apparatus.

Also, in the invention, the external maintenance apparatus sets, after having recognized the operation state of the image-forming apparatus, the adjusted state data for the image-forming apparatus which has been transmitted from the host apparatus. This means that the state data is not set while the image-forming apparatus is operated.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Now referring to the drawings, preferred embodiments of the invention are described below.

Figure 1:
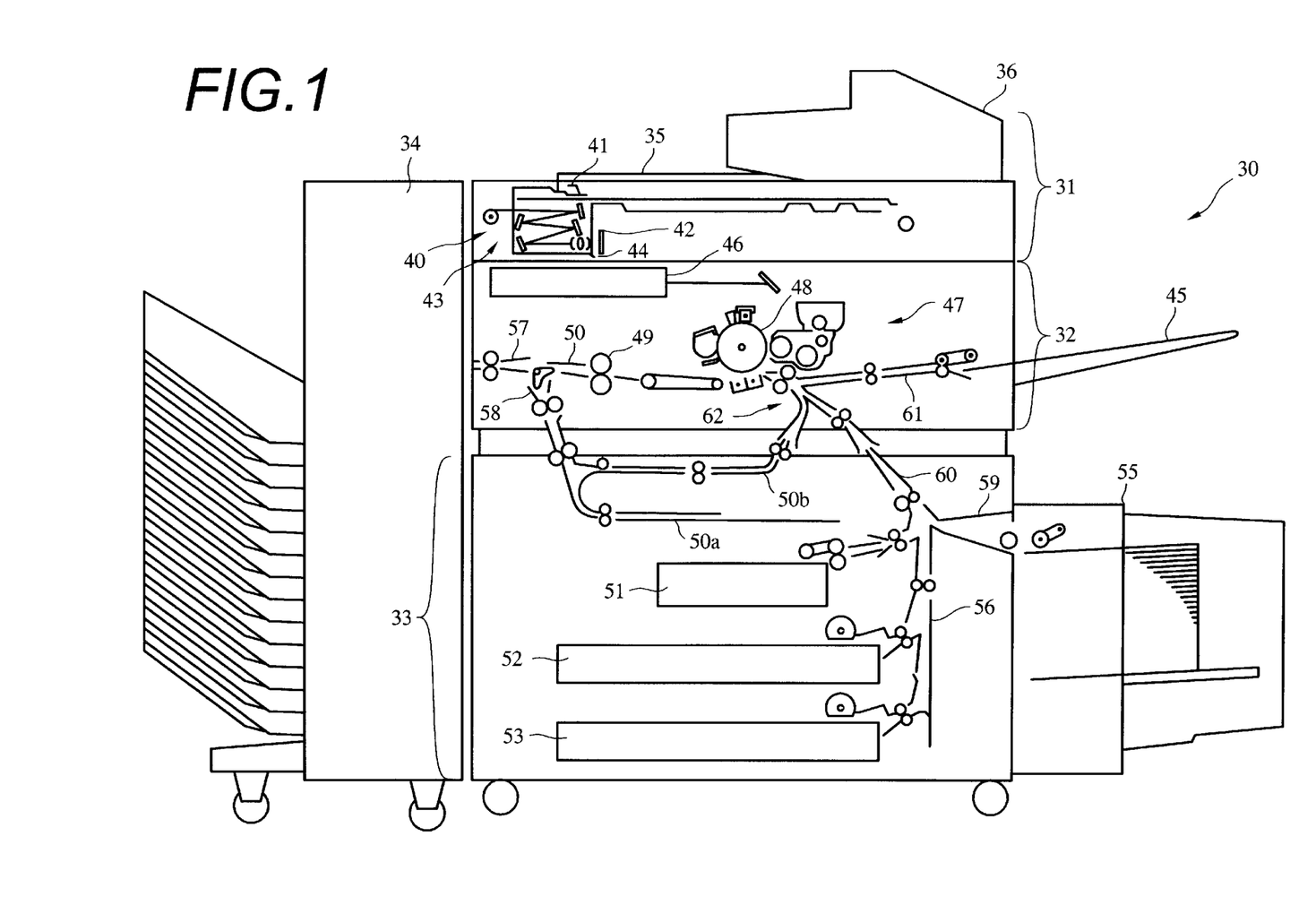
FIG. 1 is an illustration of the configuration of a digital copier which is an example of the image-forming apparatuses to which the maintenance system according to the present invention may be applied.

FIG. 1 is an illustration of the configuration of a digital copier which is an example of the image-forming apparatuses to which the maintenance system according to the invention may be applied. The digital copier 30 comprises a scanner unit 31, a laser printer unit 32, a multistage paper feeder unit 33, and a sorter 34. The scanner unit 31 is composed of a transparent hard glass-made document table 35, an automatic recirculating document feeder (hereunder abbreviated to RDF) 36 and a scanner unit 40. The RDF 36 feeds a plurality of loaded document sheets to a location opposed to the scanner unit 40 sheet by sheet. The RDF 36 is equipped with a mechanism for turning documents upside down, and the scanner unit 40 reads either or both sides of the documents depending on the selection of the operator. The scanner unit 40 is equipped with an exposure lamp 41 for exposure of the documents, a mirror 43, a lens 44, and a charge coupled device (hereunder abbreviated to "CCD") 42. Rays of light reflected by the exposure lamp 41 are focused onto the CCD 42 via the mirror 43 and the lens 44.

The scanner unit 31 is designed in such a manner that the scanner unit 40 moves along the underside of the document table 35 when an image of a document placed on the document table 35 is read. When a document is conveyed by the RDF 36, the document is conveyed while the scanner unit 40 is at rest at a given location under the RDF 36. Image data of the document which is read by the scanner unit 40 is sent to the image processor unit to be processed in a variety of ways, and is then stored temporarily in a memory in the image processor unit for supply of the image data in the memory in response to output instructions.

The laser printer unit 32 is composed of a manual copy sheet feed tray 45, a laser writing unit 46 for irradiation with laser light on the basis of the image data, and an electrophotographic processor unit 47 for executing an electrophotographic process. The laser writing unit 46 is equipped with a semiconductor laser which is driven based on the image data which is fed by the memory, a polygon mirror which polarizes the laser light at a uniform angular rate, an fθ lens for correction of the laser light, etc. The electrophotographic processor unit 47 is equipped with an changing device, a developing device, a transferring device, a peeling device, a cleaning device, and an antistatic device placed around a photoconductor drum 48, for transfer of the developed images formed on the surface of the photoconductor drum 48 to sheets by a well-known electrophotographic process. In the laser printer unit 32, a copy sheet conveying path 50 is provided downstream from a fixing device 49 in the direction of conveying of copy sheets. The copy sheet conveying path 50 is branched into a conveying path 57 which leads to a sorter 34, and a conveying path 58 which leads to the multistage copy sheet feeder unit 33.

The multistage copy sheet feeder unit 33 comprises first through third cassettes 51–53 for accommodating single-size sheets, respectively, and may further comprise a fourth cassette 55 if desired. The conveying path 58 is branched into an inverting path 50a and a duplex/synthetic copy sheet path 50b in the multistage copy sheet feeder unit 33. The inverting path 50a is provided for turnover of one-side-copied sheets in duplex copying mode for copying images on both sides of the sheets. The duplex/synthetic copy path 50b is at once the path for conveying copy sheets from the inverting path 50a to the location of the photoconductor drum 48 for producing images in duplex copying mode, and the path for conveying first-image-copied copy sheets to the location of the photoconductor drum 48, without inverting the copy sheets, for producing images in synthetic copying mode for copying a plurality of images on one sides of copy sheets.

Further, a common conveying path 56 is provided in the multistage copy sheet feeder unit 33. This common conveying path 33, which is connected to a conveying path 60, is the path for guiding copy sheets fed by the first through third cassettes 51–53 to the electrophotographic processor unit 47. A conveying path 59 from the fourth cassette 55 merges with the common conveying path 56 at the midpoint along the latter. At the point 62 of juncture in the laser printer unit 32, the conveying path 60 is merged with the duplex/synthetic copy path 50b and a conveying path 61 from the manual copy sheet feed tray 45.

The sorter 34 accommodates, after sorting or stacking, copied sheets which have been ejected via an ejected-copysheet conveying path 57 which extends downstream from the conveying path 50 in the direction of conveyance of copy sheets.

Figure 2:
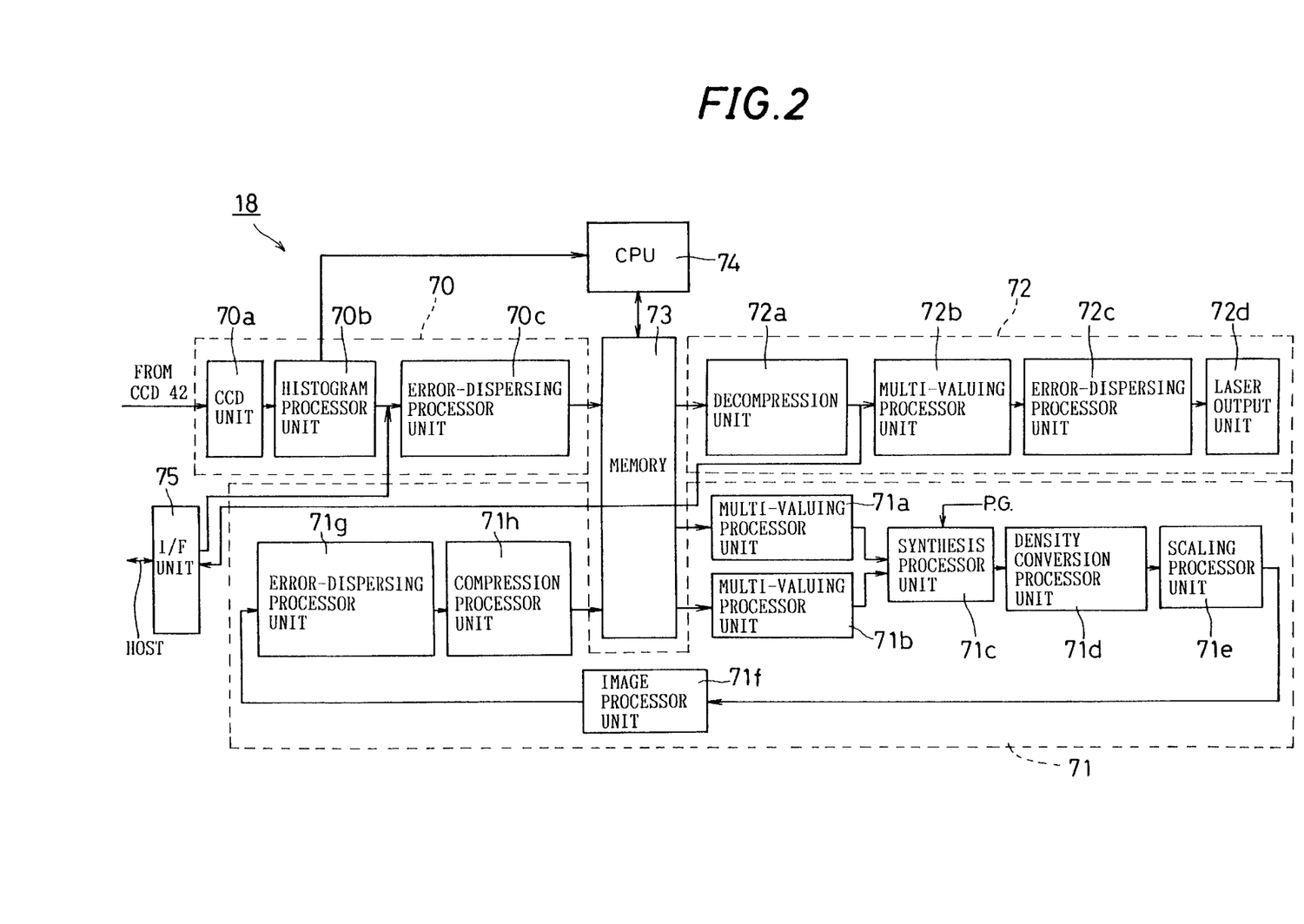
FIG. 2 is a block diagram illustrative of details of the configuration of the image processor unit of the digital copier.

FIG. 2 is a block diagram illustrative of details of the configuration of the image processor unit of the digital copier described above. The image processor/control unit provided in the body 1 of the copier is equipped with an image data input unit 70, an image data processor unit 71, an image data output unit 72, a RAM-containing memory 73, a CPU 74, and an interface unit 75. The image data input unit 70, which is equipped with a CCD unit 70a, a histogram processor unit 70b, and an error-dispersing processor unit 70c, subjects the image data of the document read by the CCD 42 to conversion to binary values which are then stored in the memory 73 temporarily after being processed by an error dispersion method with reference to a histogram of the resulting binary digital values. In the CCD unit 70a, electric analog signals matching the respective image densities of the image data are subjected to A/D conversion, and then undergo MTF correction, monochrome correction, and gamma correction to be output as 8-bit (256-level) digital signals to the histogram processor unit 70b.

In the histogram processor unit 70b, density information (histogram data) is obtained by the addition of the digital signals which have been output from the CCD unit 70a, according to 256-level pixel densities. If necessary, the histogram data is sent to the CPU 74, or to the error-dispersing processor unit 70c as pixel data. The CPU 74 recognizes the image data on the basis of the histogram data. In the error-dispersing processor unit 70c, the 8-bit/pixel digital signals output from the CCD unit 70a are converted into 1-bit (binary) signals, and a redistributing operation is performed to faithfully reproduce the local concentrations of the document by an error dispersion method which is a pseudo-halftone-processing, more specifically, a method by which the error caused by conversion to binary values is considered when binary values of the adjacent pixels are determined.

The image processor unit 71 comprises a multi-valuing processor units 71a, 71b, a synthesis processor unit 71c, a density conversion unit 71d, a scaling unit 71e, an image processor unit 71f, an error-dispersing processor unit 71g, and a compression processor unit 71h. The image processor unit 71 is a processor unit for finally converting the input image data into image data in format desired by the operator, and the converted image data is finally stored in the memory 73 as fax transmission-format data.

Here, it is to be noted that the respective processor units mentioned above in the image processor unit 71 function as necessary. More specifically, the data converted to binary values in the error-dispersing processor unit 70c is converted back into 256-level values in the multi-valuing processor units 71a, 71b. A logic operation is selectively performed in the synthesis processor unit 71c on a pixel basis. The data to be subjected to the operation includes the image data stored in the memory 73 and bit data from a pattern generator (PG). In the density conversion unit 71d, a relationship is optionally established between the input density and the output density for the 256-level digital signals with reference to a given level conversion table. In the scaling unit 71e, processing for interpolation is performed based on the known input data, depending on the scaling factor instructed, to acquire pixel data on the scaled target pixels, and the scaling is first performed in the sub-scanning direction and then in the main scanning direction.

In the image processor unit 71f, the input image data is subjected to various methods for image processing to collect information on the data string by extraction of the features or otherwise. Like processing as performed in the error-dispersing processor unit 70c of the image data input unit 70 is performed in the error-dispersing processor unit 71g. The binary data is compressed by run length coding in the compression processor unit 71h. A character recognition unit 71i extracts letters by the isolated-graphic separation method, the stroke-length analysis method, the superimposition method, the feature extraction method or the structural analysis method which is explained below. Here, regarding the compression processor of the image data, note that the compression processor is performed in the final loop when the final output image data is completed.

Regarding recognition of characters, the isolated-graphic separation method is a method of separating image data into a series of unit graphics, and determining whether the graphics are characters or line drawings depending on whether the rectangle circumscribing each graphic matches a character size, by referring to the features of characters which are usually small and stand isolated. The stroke-length analysis method is a method of detecting strokes which construct each graphic, and determining that the graphic is not a character if any one stroke has a length greater than a given one. The superimposition method is a method by which a graphic estimated to be a character on the basis of the extracted features is superimposed on patterns of stored characters one by one for matching. The feature extraction method includes extraction of the features of each character, to determine whether a segment, curve, enclosure, voiced sound symbol, tail, etc. which may characterize the character are present or not. The structural analysis method is a method of separating each letter into components, and analyzing the features of and relations between the components.

The image data output unit 72 comprises a decompression processor unit 72a, a multi-valuing processor unit 72b, an error-dispersing processor unit 72c, and a laser output unit 72d. The image output unit 72 is designed in such a manner that the compressed image data stored in the memory 73 is decompressed and converted back into the original 256-level data, error dispersion is performed for the tetranary data which produces halftones with smoother gradients than the binary data, and the data is transferred to the laser output unit 72d. More specifically, the image data compressed in the compression processor unit 71b is decompressed in the decompression processor unit 72a, and like processing as performed in the multi-valuing processor units 71a, 71b of the image processor unit 71 is performed in the multi-valuing processor unit 72b. Like processing as performed in the error-dispersing processor unit 70c of the image data input unit 70 is performed in the error-dispersing processor unit 72c. In the laser output unit 72d, the digital image data is converted into ON/OFF signals for the laser on the basis of the control signals from a printer-unit control CPU 79, which bring the laser to the ON/OFF states.

Here, although the data which is worked with in the image data input unit 70 and the image data output unit 72 is stored in the memory 73 as fax transmission-format data which is basically binary data, in order to minimize the requisite capacity of the memory 73, the image data may be converted into tetranary data for the processing, in order to prevent degradation thereof.

The interface unit 75 is connected to an external apparatus, which is described later, via a data communications line (not shown), and captures data output from the external apparatus to supply the data to the error-dispersing processor unit 70c of the image data input unit 70. The data is temporarily stored in the memory 73 after being processed as described above through the error-dispersing processor unit 70c. Further, the image data stored in the memory 73 may be supplied to the interface unit 75 via the decompression processor unit of the image data output unit 72, and output from the interface unit 75 to the external apparatus.

Figure 3:
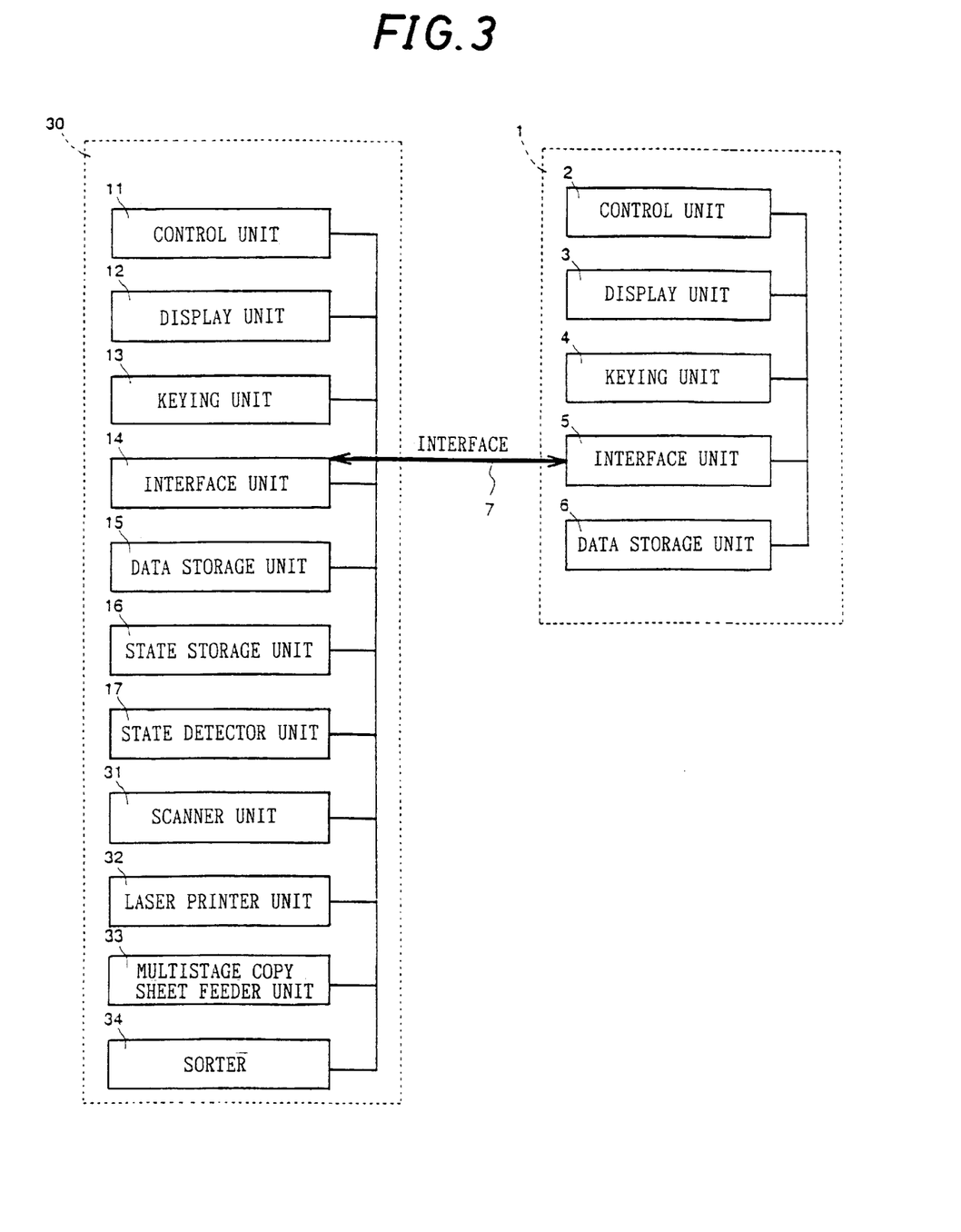
FIG. 3 is a block diagram illustrative of the configuration of the maintenance system according to the invention.

FIG. 3 is a block diagram illustrative of the configuration of the maintenance system according to the invention. Connected to the control unit 11 of the digital copier 30 are a display unit 12 and a keying unit 13 which constitute the control panel provided on the top surface of the digital copier 30. In addition, an interface unit 14, a data storage unit 15, a state storage unit 16, a state detector unit 17, a scanner unit 31, a laser printer unit 32, a multistage copy sheet feeder unit 33, and a sorter 34 are connected to the control unit 11. The control unit 11 is designed so that the copying conditions, etc. are set by inputting with the keying unit 13, and the display unit 12 displays data, including the settings.

The maintenance apparatus 1 is composed of, for example, a personal computer, wherein a the display unit 3, a keying unit 4, an interface unit 5, and a data storage unit 6 are connected to a control unit 2. The control unit 11 of the digital copier 30 and the control unit 2 of the maintenance apparatus 1 are connected to each other via the interface unit 14 of the digital copier 30, the interface unit 5 of the maintenance apparatus 1, and a data communications line 7. Data communications between the digital copier 30 and the maintenance apparatus 1 may be performed via the data communications line 7.

Figure 4A:
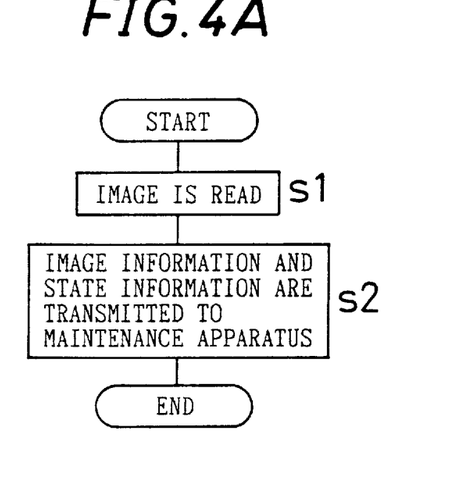
FIGS. 4A–4C are flow charts for part of the processing procedures by the control unit by the digital copier and by the control unit of the maintenance apparatus for adjustment of the scanner unit of the digital copier with the maintenance system according to the invention, for example.
Figure 4B:
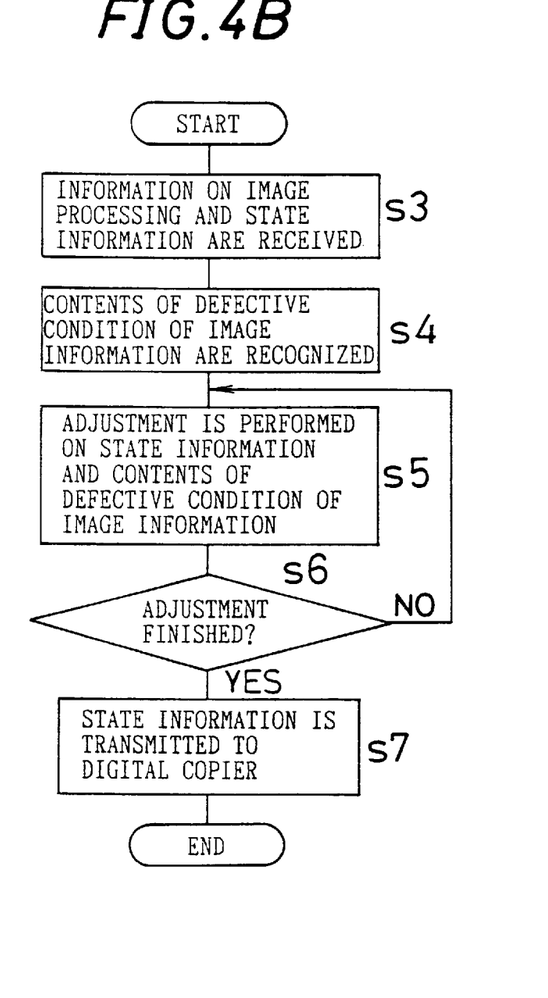
Figure 4C:
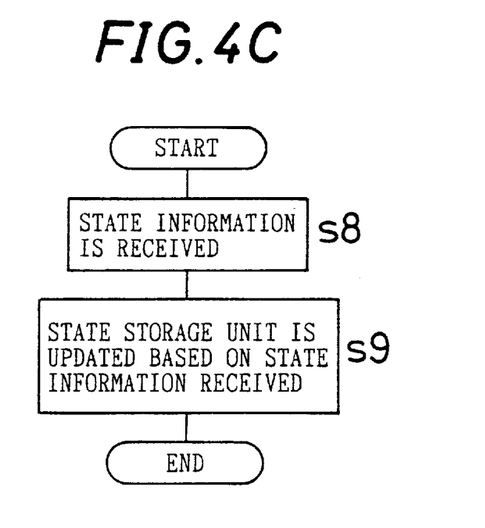

FIG. 4 is a flow chart which illustrates part of the processing procedures by the control unit of a digital copier and by the control unit of a maintenance apparatus for adjustment of the scanning unit of the digital copier with the maintenance system described above. When the condition of the digital copier 30 becomes defective, and an adjusting operation is performed therefor, an image is first read by the digital copier 30 (s1), and both the information on the read image and the state information at the time of reading which has been read from the state storage unit 16 are then sent to the maintenance apparatus 1 (s2).

The maintenance apparatus 1 receives the image information and the state information sent from the digital copier 30 (s3), and then recognizes the contents of the defective condition of the image information (s4). Thereafter, the state information, which affects the recognized contents of the defective condition of the image information, is read to implement an adjusting process (s5). When the adjusting process is completed (s6), the adjusted state information is sent from the maintenance apparatus 1 to the digital copier 30 (s7).

Upon receipt of the adjusted state information sent from the maintenance apparatus 1 (s8), the digital copier 30 updates the contents of memory in the state storage unit 16 on the basis of the state information received (s9).

Figure 5A:
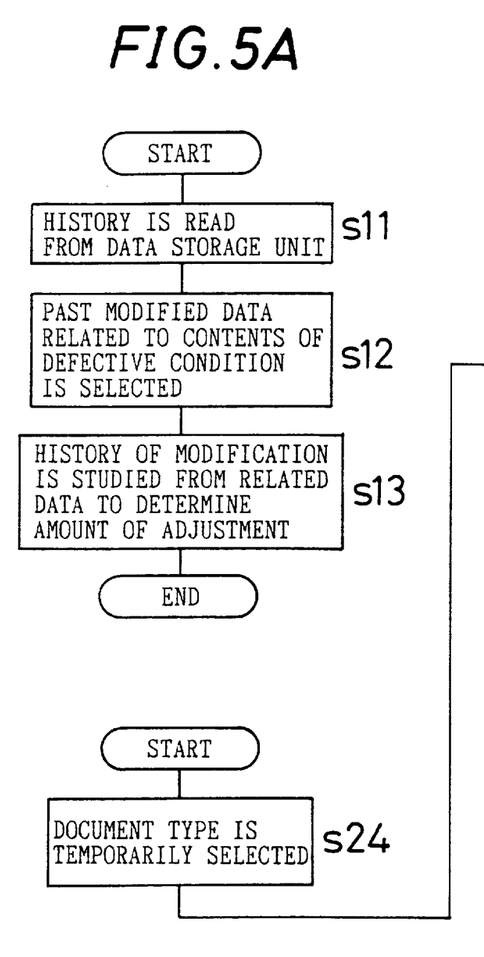
FIGS. 5A and 5B are flow charts illustrative of details of adjustment of the state information with the maintenance apparatus which is contained in the maintenance system according to the invention.

FIG. 5 is a detail flow chart illustrative of the adjustment of the state information with the maintenance apparatus described above. According to the adjustment method based on the history, first, as illustrated in FIG. 5(A), the data storage unit 6 is searched for the contents of the defective condition recognized from the image information (s11), and modification data which matches the contents of the defective condition is selected (s12). The modification data is composed of the state information adjusted in the past to obviate like defective conditions, and methods available for the adjustment, and the control unit 2 of the maintenance apparatus 1 determines the amount of adjustment depending on the extent of the present defective condition (s13).

Figure 5B:
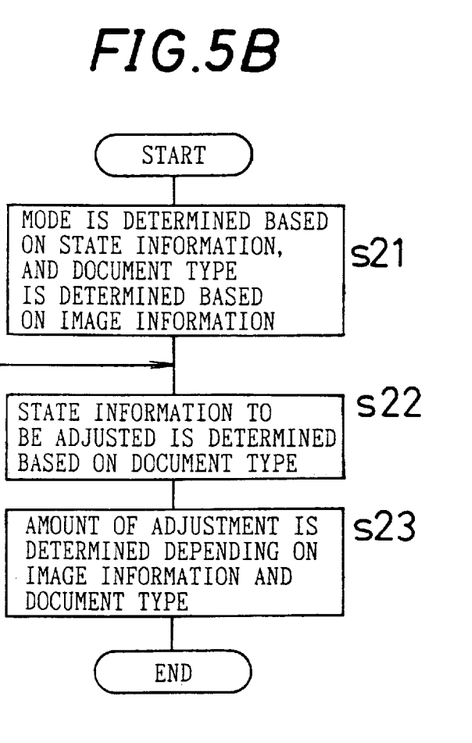

On the other hand, according to the adjustment method depending on document types, as illustrated in FIG. 5(B), the state information is read to determine whether the copying mode is character document mode or photographic document mode, while the document is judged to be one of a character document, photographic paper document or printed matter document (s21), and after this the state information to be adjusted is determined depending on the copying mode and the document type (s22), and the amount of adjustment is determined depending on the contents of the defective condition of the image information, and the type of the document (s23). Here, it is also possible to temporarily set conditions which match a specific type of document (s24), and to determine the state information to be adjusted and the amount of adjustment so as to match the specific type of document.

The foregoing processing allows the maintenance apparatus 1 to judge the state of the scanner unit 31 on the basis of the image information and the state information of the digital copier 30, and to perform fine, rapid adjustment therefor. Since a copying process may be executed even while the digital copier 30 waits for arrival of the adjusted state information which is sent from the maintenance apparatus 1 after the digital copier 30 has sent the image information and the state information to the maintenance apparatus 1, the copying operation which requires immediate execution may be continued.

For example, in the scanner unit 40, in cases where the amount of light received by the CCD 42 is decreased due to a lower amount of light from the light source 41 for exposure of documents or a lower reflection factor due to deposition of dust on the reflector, which is usually compensated in the CCD unit 70a of the image data input unit 70, the S/N ratio drops when the output signals from the CCD 42 are amplified, thus resulting in poorer image quality. Here, the maintenance apparatus 1, judging that the lower image quality has resulted from the smaller amount of light received by the CCD 42, and the excessively increased compensation coefficient, functions to increase the driver voltage of the light source to thereby supplement the amount of light received by the CCD 42.

In addition, the adjustment may be carried out without erasing the image information even when the adjustment of the image information storage means, including the state storage unit 16, is performed by transmitting the image information stored in the state storage unit 16 of the digital copier 30 to the maintenance apparatus 1, and temporarily storing the image information in the data storage unit 6 of the maintenance apparatus 1 during the process of maintenance, and transmitting the image information stored in the data storage unit 6 to the digital copier 30 after the maintenance has been finished.

Figure 6A:
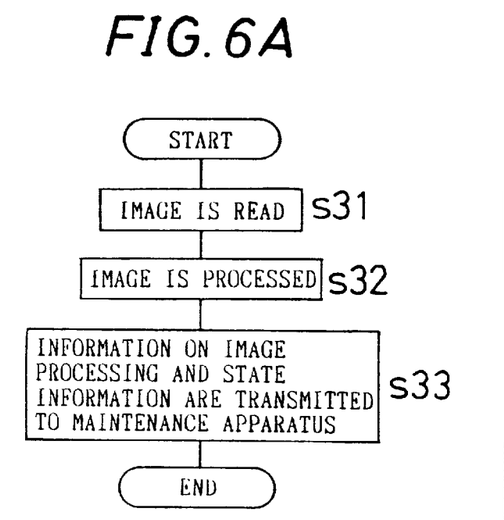
FIGS. 6A–6C are flow charts illustrative of the processing procedures by the control unit for adjustment of, for example, the image processing unit of the digital copier, with the maintenance system according to the invention.
Figure 6B:
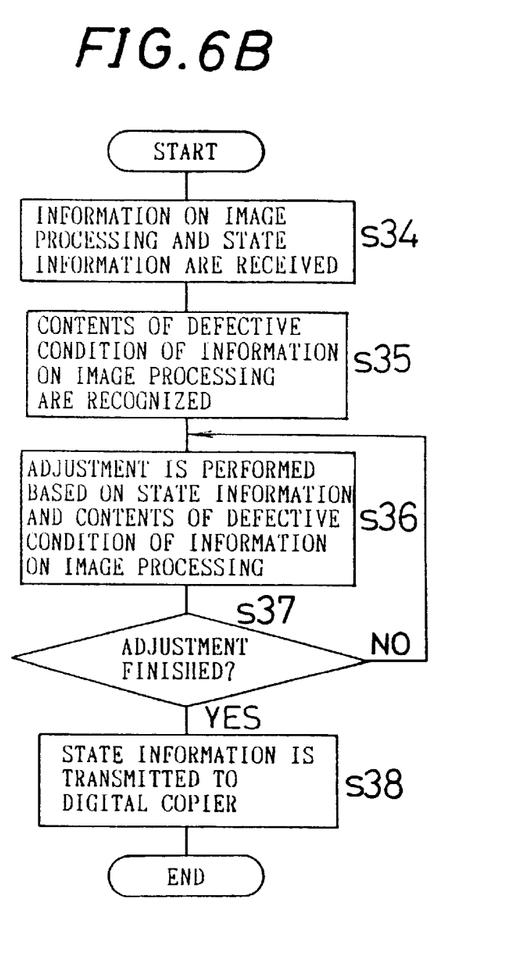
Figure 6C:
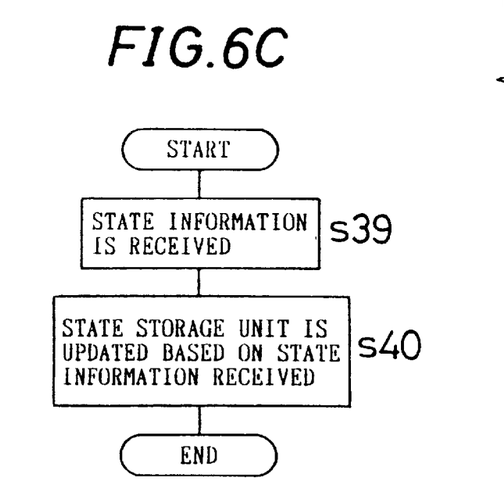

FIG. 6 is a flow chart illustrative of the processing procedures for adjustment of the image processing unit of a digital copier, with the maintenance system described above. For adjustment of the image processor unit of the digital copier 30, an image of a document is first read by the scanner unit 31 (s31), the image is processed (s32), and the information on the image processing is then transmitted to the maintenance apparatus 1 together with the state information (s33).

The maintenance apparatus 1 receives the information on the image processing and the state information sent from the digital copier 30 (s34), and then recognizes the contents of the defective condition of the information on the image processing (s35). Thereafter, the state information, which affects the recognized contents of the defective condition of the information on the image processing, is read to implement an adjusting process (s36). When the adjusting process is completed (s37), the adjusted state information is sent from the maintenance apparatus 1 to the digital copier 30 (s38).

Upon receipt of the adjusted state information sent from the maintenance apparatus 1 (s39), the digital copier 30 updates the contents of memory in the state storage unit 16 on the basis of the state information received (s40).

For example, although the image quality is adjusted in character document mode and photographic document mode with reference to a preset I/O conversion curve in the density conversion unit 71d of the image processor unit 71, the image quality drops when the document is calendered photographic paper, due to its higher reflection factor than standard photographic documents, so far as the image quality is adjusted in normal photographic document mode, since the adjustment of the image quality is performed on the assumption that the document is a standard one. To prevent this, the control unit 2 of the maintenance apparatus 1 recognizes in step s35 that the processed image is too bright, and modifies the I/O conversion curve for adjustment of the image quality in step s36, based on the data of the image subjected to the image processing, which is the information on the image processing sent from the digital copier 30, the set mode which is information on the state, and the I/O conversion curve for adjustment of the image quality.

The foregoing processing allows the maintenance apparatus 1 to judge the state of the image processor unit on the basis of the information on the image processing and the state information of the digital copier 30, and to perform fine, rapid adjustment therefor. Since a copying process may be executed even while the digital copier 30 waits for arrival of the adjusted state information which is sent from the maintenance apparatus 1 after the digital copier 30 has sent the information on the image processing and the state information to the maintenance apparatus 1, the copying operation which requires immediate execution may be continued.

Figure 7:
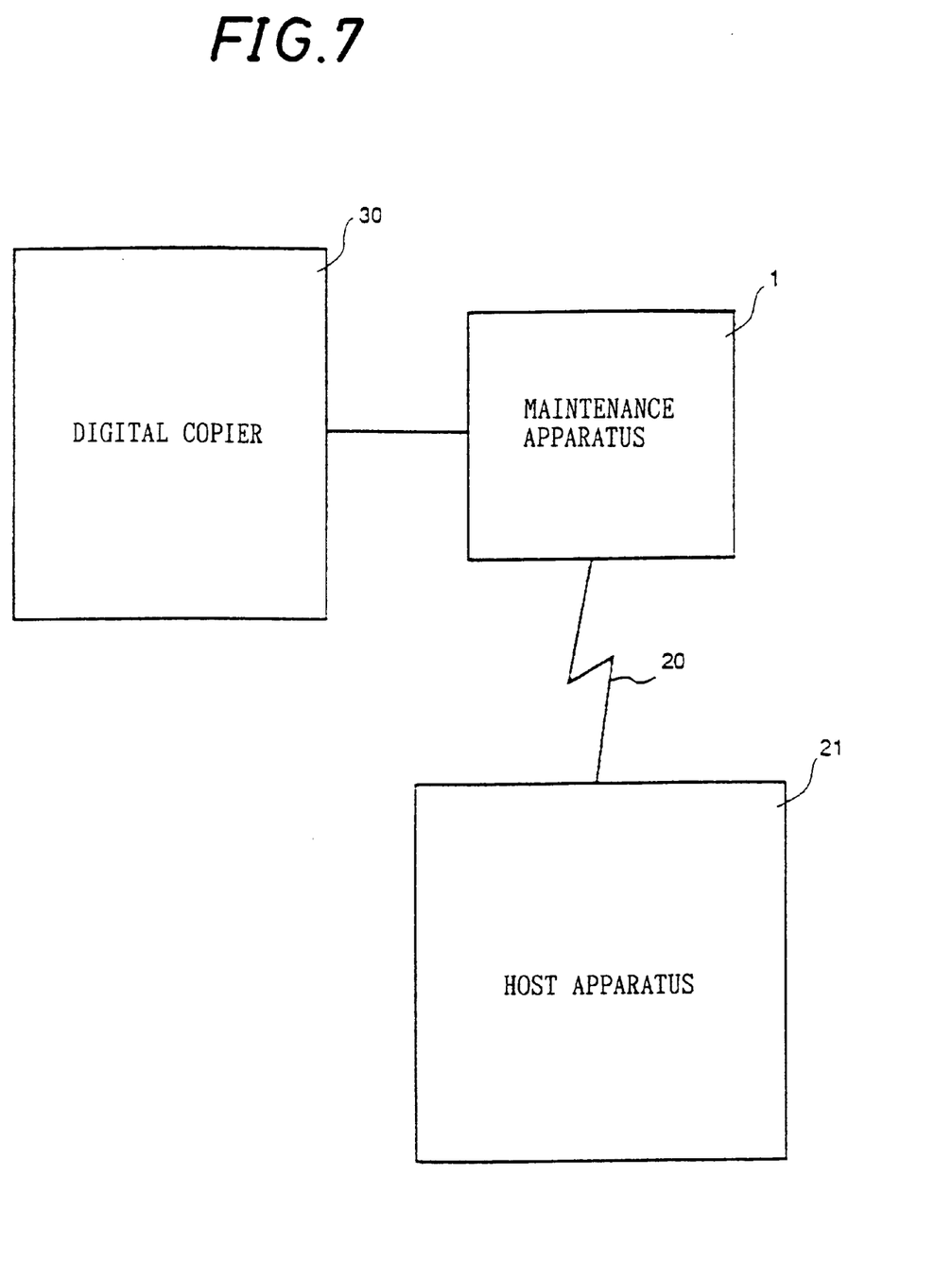
FIG. 7 is an illustration of another embodiment of the maintenance apparatus according to the invention.

FIG. 7 is an illustration of another embodiment of the maintenance system according to the invention. The maintenance apparatus 1 connected to the digital copier 30 is connected to a host apparatus 21 through a public telephone line 20, for example. The host apparatus 21, which is composed of a personal computer, etc. as in the case of the maintenance apparatus 1, is installed in a service center or the like which is apart from the digital copier 30 and the maintenance apparatus 1, and is operated by a repair person, unlike the digital copier 30 and the maintenance apparatus 1 which are operated by the user.

Figure 8A:
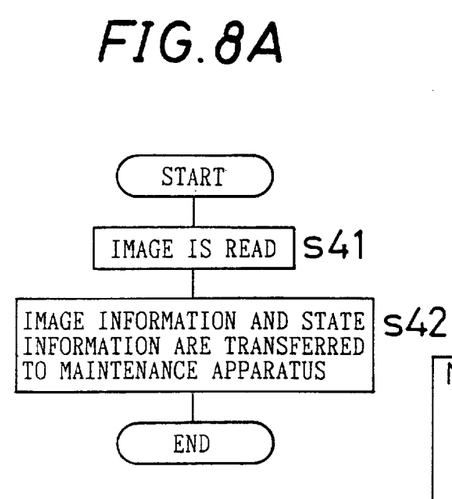
FIGS. 8A and 8B are illustrations of the processing procedures for maintenance with the maintenance system shown in FIG. 7.
Figure 8B:
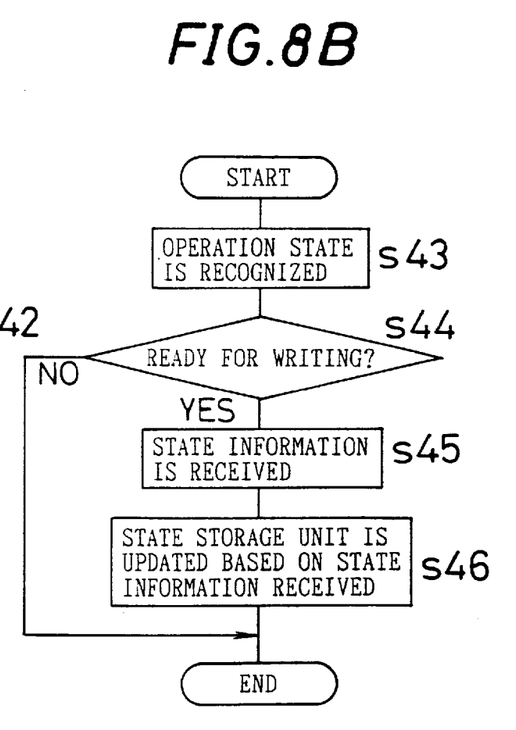
Figure 9A:
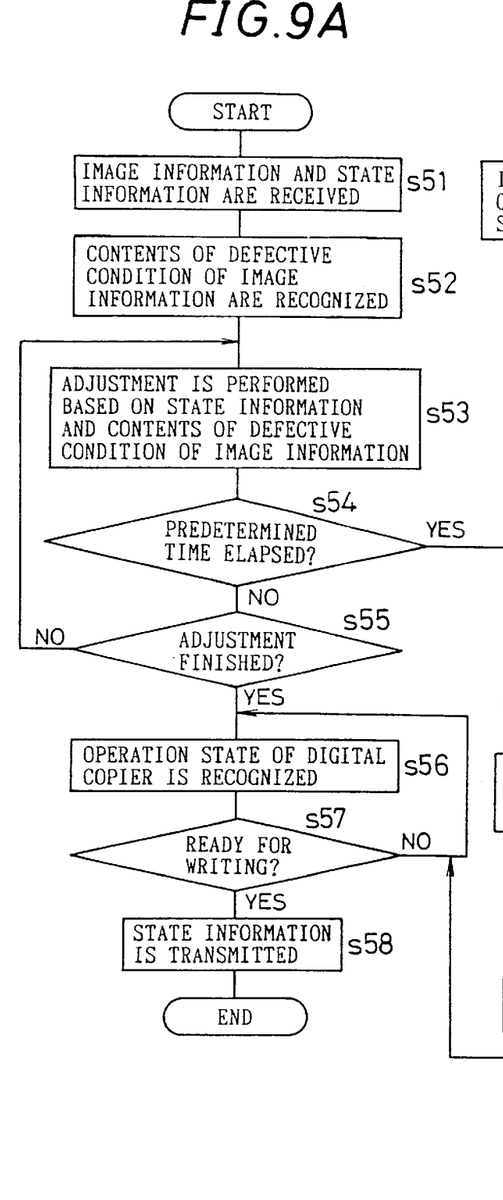
FIGS. 9A and 9B are flow charts similar to the charts in FIG. 8.
Figure 9B:
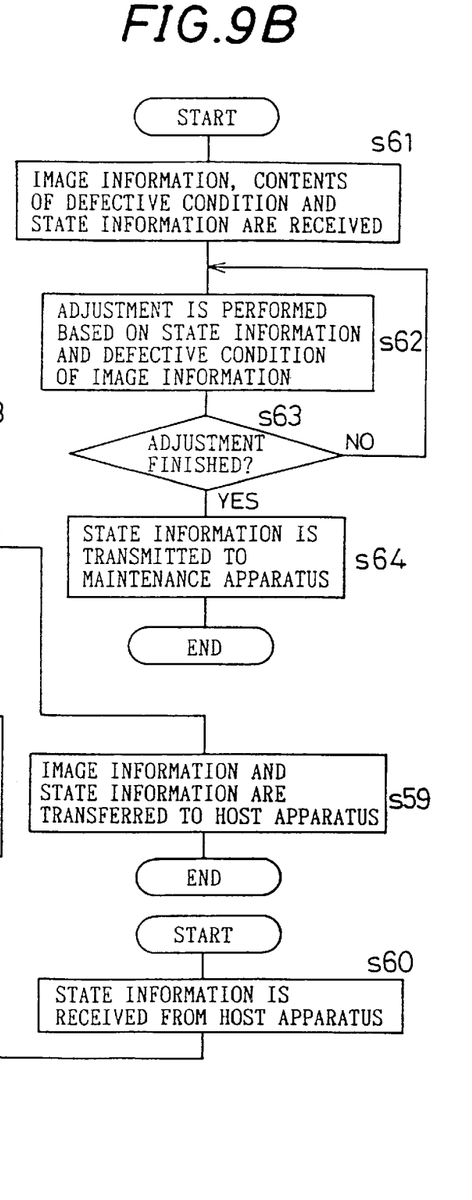

FIG. 8 and FIG. 9 are flow charts which illustrate the processing procedures for maintenance with the maintenance system described above. When adjustment of the state information of the digital copier 30 is necessary due to lower image quality or the like, an image of a document is first read by the digital copier 30 (s41), and the information on the read image is then sent to the maintenance apparatus 1 together with the state information which is read from the state storage unit 16 (s42).

Receiving the image information and the state information sent from the digital copier 30 (s51), the maintenance apparatus 1 recognizes the contents of the defective condition of the image information (s52), and performs the adjustment on the basis of the contents of the defective condition of the image information and the state information (s53). It is determined whether the adjusting operation is completed within a predetermined time (s54), and when the adjusting operation has been completed within the predetermined time (s55), the operation state of the digital copier 30 is recognized (s56), and the adjusted state information is transmitted to the digital copier 30 in cases where the digital copier 30 is ready for writing of the data thereto (s57, s58). When the adjusting operation is not finished within the predetermined time, the image information, the contents of the defective condition, and the state information are transmitted to the host apparatus 21 (s54, s59).

Receiving the image information, the contents of the defective condition, and the state information sent from the maintenance apparatus 1 (s61), the host apparatus 21 performs the adjustment on the basis of the contents of the defective condition of the image information, and the state information (s62). After the adjusting operation has been finished (s63), the adjusted state information is transmitted to the maintenance apparatus 1 (s64).

Receiving the adjusted state information from the host apparatus 21 (s60), the maintenance apparatus 1 recognizes the operation state of the digital copier 30 (s56), and when the digital copier 30 is ready for writing of the data thereto, the adjusted state information is transmitted to the digital copier 30 (s57, s58).

The digital copier 30, upon receipt of instructions for recognizing the operation state from the maintenance apparatus 1, recognizes its own operation state (s43), and gives a response when ready for writing of the data thereto, and receives the adjusted state information which is transmitted from the maintenance apparatus 1 (s44, s45). The control unit 11 of the digital copier 30 updates the contents of memory in the state storage unit 16 on the basis of the contents of the adjusted state information received (s46).

In cases where the adjusting operation is not finished by the processing described above within the predetermined time, it is judged that the adjusting operation requires adjusting performance beyond the adjusting capability of the maintenance apparatus 1, and the adjusting operation is performed with the host apparatus 21 connected to the maintenance apparatus 1. Since the host apparatus 21 is installed in a service center at which a repair person is stationed, and thus allows adjustment beyond the adjusting capability of the maintenance apparatus 1 to be performed, a complicated adjusting operation may be accomplished in a fine, reliable manner. In addition, the copying operation can cope with speedy processing as required by minimizing the downtime during the copying process by the digital copier 30.

Figure 10A:
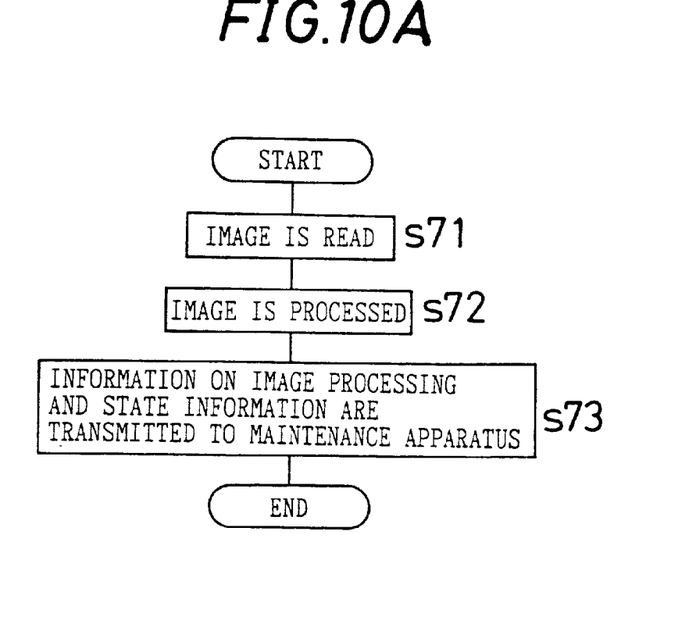
FIGS. 10A and 10B are flow charts illustrative of the processing procedures for adjustment of the image processor unit of the digital copier with the maintenance system shown in FIG. 7.
Figure 10B:
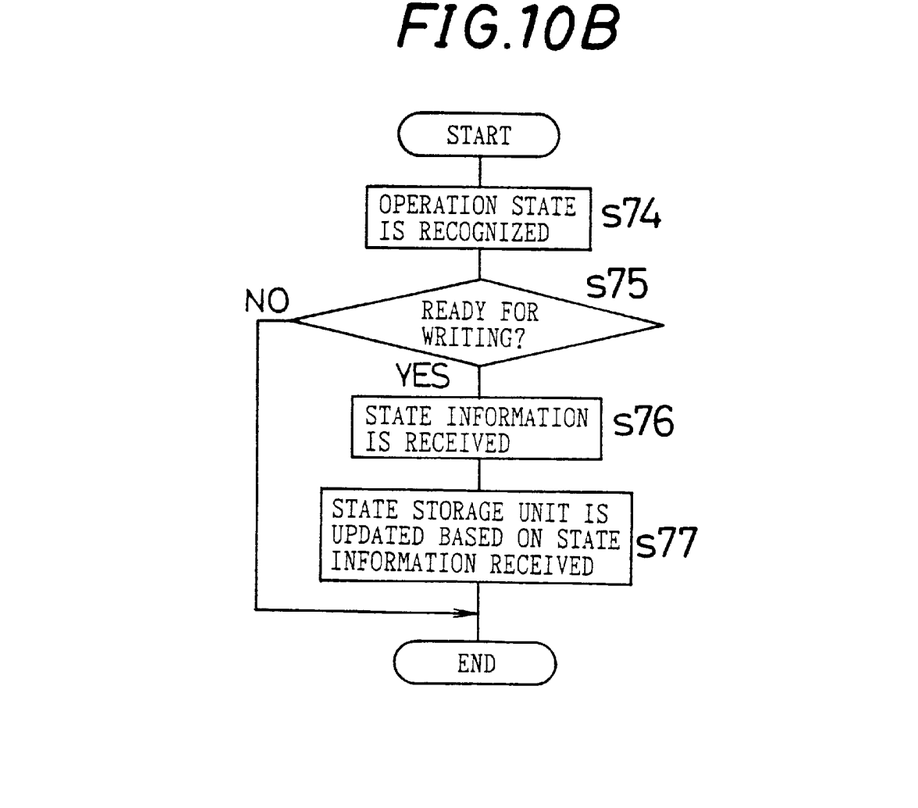
Figures 11A, 11B:
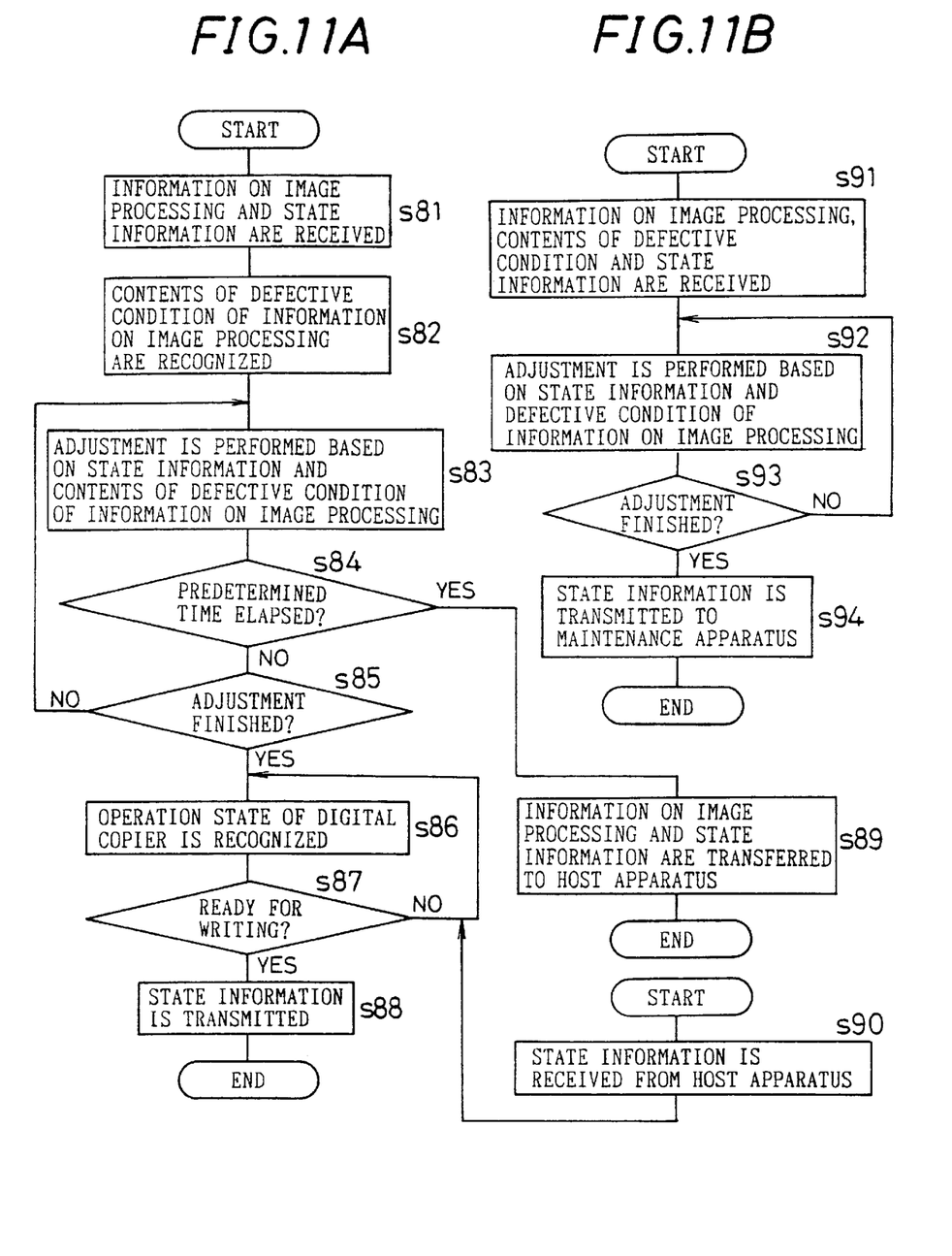
FIGS. 11A and 11B are flow charts, similar to FIG. 10, illustrative of the processing procedures for adjustment of the image processor unit of the digital copier with the maintenance system shown in FIG. 7.

FIG. 10 and FIG. 11 are flow charts which illustrate the processing procedures for adjustment of the image processor unit of a digital copier with the maintenance system described above. The digital copier 30 is designed so that an image of a document is read, and the information on the read image is then subjected to image processing in the image processor unit 70 (s71, s72), and transmitted to the maintenance apparatus 1 together with the state information (s73).

Receiving the information on the image processing and the state information sent from the digital copier 30 (s81), the maintenance apparatus 1 recognizes the contents of the defective condition of the information on the image processing (s82), and performs the adjustment on the basis of the contents of the defective condition of the information on the image processing and the state information (s83). It is determined whether the adjusting operation is completed within a predetermined time (s84), and when the adjusting operation has been completed within the predetermined time (s83), the operation state of the digital copier 30 is recognized (s86), and the adjusted state information is transmitted to the digital copier 30 in cases where the digital copier 30 is ready for writing of the data thereto (s87, s88). When the adjusting operation is not finished within the predetermined time, the information on the image processing, the contents of the defective condition, and the state information are transmitted to the host apparatus 21 (s84, s89).

Receiving the information on the image processing, the contents of the defective condition, and the state information sent from the maintenance apparatus 1 (s91), the host apparatus 21 performs the adjustment on the basis of the contents of the defective condition of the information on the image processing, and the state information (s92). After the adjusting operation has been finished (s93), the adjusted state information is transmitted to the maintenance apparatus 1 (s94).

Receiving the adjusted state information from the host apparatus 21 (s90), the maintenance apparatus 1 recognizes the operation state of the digital copier 30 (s86), and when the digital copier 30 is ready for writing of the data thereto, the adjusted state information is transmitted to the digital copier 30 (s87, s88).

The digital copier 30, upon receipt of instructions for recognizing the operation state from the maintenance apparatus 1, recognizes its own operation state (s74), gives a response when ready for writing of the data thereto, and receives the adjusted state information which is transmitted from the maintenance apparatus 1 (s75, s76). The control unit 11 of the digital copier 30 updates the contents of memory in the state storage unit 16 on the basis of the contents of the adjusted state information received (s77).

Since the processing described above allows the adjustment of the state information on the image processor unit 70 of the digital copier 30 to be performed using adjusting performance beyond the adjusting capability of the maintenance apparatus 1, the complicated adjusting operation may be performed in a fine and reliable manner.

Although all the embodiments above are described with reference to digital copiers, the invention may also be applied to other image forming apparatuses such as laser printers in a like manner.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A maintenance system for an image-forming apparatus, comprising:

an image-forming apparatus including image-scanning means for reading images of documents and image-forming means for forming the images based on the image data and preset state data;

an external maintenance apparatus for adjusting the state data base on the image data and the state data read from the image-forming apparatus, determining if a predetermined period has elapsed during adjusting and setting the adjusted state data to the image-forming apparatus, the external maintenance apparatus being connected to the image-forming apparatus for supplying the state data to the image-forming apparatus;

means for supplying the image data and the state data from the image data forming apparatus to the external maintenance apparatus; and means for adjusting the state data based on the image data and the state data when supplying the state data to the image-forming apparatus.

2. The maintenance system according to claim 1, wherein the state data is temporarily adjusted so as to match a document of a specific type depending on the usage of the image-forming apparatus.

3. The maintenance system according to claim 1, further comprising means for storing the history of the adjusted state data set for the image-forming apparatus via the external maintenance apparatus.

4. The maintenance system according to claim 3, wherein the state data is temporarily adjusted so as to match a document of a specific type depending on the usage of the image-forming apparatus.

5. The maintenance system according to claim 3, wherein the adjusting is based on the history of the adjusted state data.

6. A maintenance system for an image-forming apparatus, comprising:

an image-forming apparatus including image-scanning means for reading images of documents and image-forming means for forming the images based on the image data and preset state data;

an external maintenance apparatus for adjusting the state data based on the image data and the state data read from the image-forming apparatus determining if a predetermined period has elapsed during adjusting, and setting the adjusted state data to the image-forming apparatus, the external maintenance apparatus being connected to the image-forming apparatus;

a host apparatus for adjusting the state data based on the image data and the state data which are transmitted from the external maintenance apparatus, and setting by supplying the adjusted state data to the image-forming apparatus via the external maintenance apparatus, means for supplying the image data and the state data from the image forming apparatus to the external maintenance apparatus, and means including the host apparatus for adjusting the state data based on the image data and the state data when supplying the image forming apparatus.

7. The maintenance system according to claim 6, the external maintenance apparatus sets, after having recognized the operation state of the image-forming apparatus, to the image-forming apparatus, the adjusted state data which has been transmitted from the host apparatus.

8. A maintenance unit for use with an image forming apparatus comprising:

an adjusting unit external to the image forming apparatus, said adjusting unit adjusting, determining if a predetermined period has elapsed during adjusting state data based on image data and state data read from the image forming apparatus and outputting adjusted state data;

means for connecting said adjusting unit to the image forming apparatus allowing exchange by supplying of the image data, state data and adjusted state data, means for supplying the image data and the state data from the image data forming apparatus to an external maintenance apparatus, means for adjusting the state data based the on image data and the state data when supplying the state data to the image-forming apparatus.

9. The maintenance unit according to claim 8, wherein said adjusting unit temporarily adjusts the state data to match a document of a specific type depending upon image of the image-forming apparatus.

10. The maintenance unit according to claim 8, further comprising means for storing a listing of the adjusted state data.

11. The maintenance unit according to claim 10, wherein said adjusting unit temporarily adjusts the state data to match a document of a specific type depending upon image of the image-forming apparatus.

12. The maintenance unit according to claim 10, wherein the adjusting is based on the history of the adjusted state data.

13. A method for maintaining an operational state of an image forming apparatus, said image forming apparatus reading images of documents and forming images based on image data and state data, said method comprising:

supplying the image data and the state data from the image forming apparatus to an external maintenance apparatus;

adjusting the state data based on the image data and the state data from the supplying step, determining if a predetermined period has elapsed during adjusting;

supplying, when the determining step determines the predetermined period has elapsed and the adjusting is not complete, the state data and the information data to a host apparatus from the external maintenance apparatus; and outputting by supplying adjusted state data from the adjusting to the image forming apparatus.

14. The method according to claim 13, wherein the adjusting further comprises temporarily adjusting the state data to match a document of a specific type depending on the usage of the image forming apparatus.

15. The method according to claim 13, further comprising storing a history of the adjusted state data from the adjusting.

16. The method according to claim 15, wherein the adjusting further comprises temporarily adjusting the state data to match a document of a specific type depending on the usage of the image forming apparatus.

17. The method according to claim 15, wherein the adjusting is further based on the history data of the adjusted state data.

18. A method for maintaining an operational state of an image forming apparatus, said image forming apparatus reading images of documents and forming images based on image data and state data, said method comprising:

supplying the image data and the state data from the image forming apparatus to an external maintenance apparatus;

adjusting the state data based on the image data and the state data from the supplying step;

outputting adjusted state data from the adjusting step to the image forming apparatus;

determining if a predetermined period has elapsed during the adjusting;

supplying, when the determining step determines the predetermined period has elapsed and the adjusting is not complete, the state data and the information data to a host apparatus from the external maintenance apparatus;

adjusting the state data based on the image data and the image data supplied from the external maintenance apparatus, in the host apparatus; and outputting adjusted state data from the host apparatus to the image forming apparatus is via the external maintenance apparatus.

19. The method according to claim 18, further comprising:

recognizing an operation state of the image forming apparatus via the external maintenance apparatus; and providing the image forming apparatus with the adjusted state data from the external maintenance apparatus upon the recognizing.

* * * * *